United States Patent
DeLizo et al.

(10) Patent No.: US 6,679,485 B2
(45) Date of Patent: Jan. 20, 2004

(54) INTEGRATED AIR SPRING

(75) Inventors: Stan W. DeLizo, Lynnwood, WA (US); William D. Krusel, West Bloomfield, MI (US); Michael David, Everett, WA (US); Leo M. Schmidt, Seattle, WA (US); Jeffrey T. Capek, Fishers, IN (US); Daniel Levy, Waltham Abbey (GB); Daniel J. Leonard, Carmel, IN (US); Mohamad Taghizadeh, Indianapolis, IN (US)

(73) Assignee: Paccar Inc, Bellevue, WA (US)

(*) Notice: Subject to any disclaimer, the term of this patent is extended or adjusted under 35 U.S.C. 154(b) by 0 days.

(21) Appl. No.: 10/067,626

(22) Filed: Feb. 4, 2002

(65) Prior Publication Data

US 2002/0180126 A1 Dec. 5, 2002

Related U.S. Application Data

(63) Continuation of application No. 09/635,371, filed on Aug. 9, 2000, now abandoned.

(51) Int. Cl.[7] .................................................. F16F 9/04
(52) U.S. Cl. ............................... 267/64.19; 267/64.24; 267/64.27; 267/64.28; 280/124.158
(58) Field of Search .......................... 267/64.19, 64.21, 267/64.24, 64.27, 35, 64.28; 137/516, 859; 280/6.15, 124.1, 124.112, 124.146, 124.154, 124.158

(56) References Cited

U.S. PATENT DOCUMENTS

| | | | |
|---|---|---|---|
| 3,850,437 A | * | 11/1974 | Owen ...................... 267/64.21 |
| 4,506,910 A | | 3/1985 | Bierens |
| 4,564,177 A | | 1/1986 | Leonard |
| 4,787,606 A | | 11/1988 | Geno et al. |
| 4,796,870 A | | 1/1989 | Hoffman et al. |
| 4,832,317 A | | 5/1989 | Alaphilippe |
| 4,852,861 A | | 8/1989 | Harris |
| 4,934,667 A | | 6/1990 | Pees et al. |
| 5,020,826 A | | 6/1991 | Stecklein et al. |
| 5,180,145 A | | 1/1993 | Watanabe et al. |
| 5,248,132 A | * | 9/1993 | Jung ........................... 267/35 |
| 5,326,082 A | * | 7/1994 | Ecktman et al. ......... 267/64.24 |
| 5,342,139 A | | 8/1994 | Hoffman |
| 5,413,316 A | * | 5/1995 | Easter ..................... 267/64.24 |
| 5,535,994 A | | 7/1996 | Safreed, Jr. |
| 5,636,826 A | | 6/1997 | Nakagaki et al. |
| 5,669,418 A | * | 9/1997 | Wode .......................... 137/859 |
| 5,782,462 A | | 7/1998 | Hein et al. |
| 5,921,532 A | * | 7/1999 | Pierce et al. ............. 267/64.19 |
| 6,056,277 A | * | 5/2000 | Wode .......................... 267/124 |
| 6,513,798 B2 | | 2/2003 | Capek et al. |

* cited by examiner

*Primary Examiner*—Pam Rodriguez
(74) *Attorney, Agent, or Firm*—Christensen O'Connor Johnson Kindness PLLC

(57) ABSTRACT

An air spring (10) for use in a motor vehicle suspension system is provided. The air spring includes a generally cylindrical flexible bladder (12) having a circular upper opening (18), a support unit (14) sealingly connected to the flexible bladder (12), and a unitary integrated top assembly (16) connected to the upper opening (18) in an air-tight manner. The support unit (14) further includes an installation fastener (52) for connection to vehicle support brackets (78). The top assembly (16) includes a sealed body (34) having an interior open volume (23) and optional attachment components positioned on the body to connect the top assembly to a vehicle main frame. The top assembly further includes an optional connection port (28) adapted for pneumatic intercommunication with other air springs and an optional fill port (48) for connection to a pressurized air system.

15 Claims, 4 Drawing Sheets

INTEGRATED AIR SPRING

CROSS REFERENCE TO RELATED APPLICATION

This application is a continuation of application Ser. No. 09/635,371, filed Aug. 9, 2000, now abandoned.

FIELD OF THE INVENTION

The present invention relates to spring devices having a flexible wall, and more particularly, to pneumatic spring devices with flexible rubber walls for use in land vehicles as energy absorbing means.

BACKGROUND OF THE INVENTION

Pneumatic springs, commonly referred to as air springs, have been used for motor vehicles for a number of years to provide cushioning between moveable parts in the vehicle. Air springs absorb shock loads impressed on the vehicle axles by the wheels striking an object in the road or falling into a depression. An air spring typically consists of a flexible rubber sleeve, also called a bellows or a bladder. The sleeve contains a supply of compressed fluid and has one or more pistons located therein or thereunder. An end cap closes off the upper region of the sleeve. During use, the piston moves axially toward and away from the end cap so as to alternatingly compress and expand the volume within the sleeve. In this manner, the air spring acts as an energy absorbing means for the vehicle.

In known air spring arrangements, there are numerous components attached to the end cap. One set of components is used to fill and refill fluid pressure within the sleeve. Another set is used to attach the air spring to the vehicle frame; another set is used to regulate fluid pressure between air springs. Such systems are effective, but are difficult to assemble and maintain due to their numerous parts. Thus, a need exists for an improved vehicle air spring that is easier to assemble and maintain, preferably by having fewer parts. The present invention is directed to fulfilling these needs and others, as described below.

SUMMARY OF THE INVENTION

In accordance with aspects of the present invention, an air spring is provided for use in a motor vehicle. The air spring includes a flexible air bladder, a support unit connected to lower portions of the bladder, and a unitary integrated top assembly connected to upper portions of the bladder. The top assembly includes a lateral shelf, a sealed body having an interior open volume and various attachment components positioned on the body for use in connecting the top assembly to the main frame. The top assembly is connected to the bladder in an airtight manner so as to accommodate a pressure within the air spring.

In accordance with other aspects of the invention, an optional connection port may be provided in the top assembly body for pneumatic communication with other air springs. In one embodiment, the top assembly body is formed in the shape of a half cone with a curved surface and an upright surface and a connection port is formed as a rigid arm extending outward from the body upright surface. In addition, an optional fill port may be provided in the top assembly to connect with a ride height system. During use, the ride height system uses the fill port to regulate the air pressure within the air springs to adjust to applied loads.

In accordance with further aspects of the invention, the top assembly body optionally includes a number of internal support ribs. In one embodiment, the internal support ribs are upright walls oriented front to back and in parallel relation to one another. Such internal support structures aide in the transmission of external loads to the mounting surface. In one embodiment, the unitary integrated top of the air spring is formed to increase the internal volume of compressible fluid in addition to the bladder volume, and to maintain an internal pressure in the range between, but not limited to, about 15 psi to about 150 psi. In another embodiment, the internal pressure is equal to or greater than 150 psi.

In accordance with still other aspects of the invention, the top assembly is formed from an injection molded plastic. Alternatively, the top assembly may be formed from a metal casting or by other unitary means.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

The present invention is an integrated air spring for use in a motor vehicle having a suspension system, a pressurized air supply source, and various air system control components (i.e., leveling valves, etc. . . . ). The air spring includes a top assembly that integrates a number of components into a single piece. The single-piece top assembly improves the structural and functional characteristics of a passive air spring during use. In addition, when the top assembly is formed as a single piece, the present invention is easier to assemble, maintain, and manufacture than known air springs.

Figure 1:
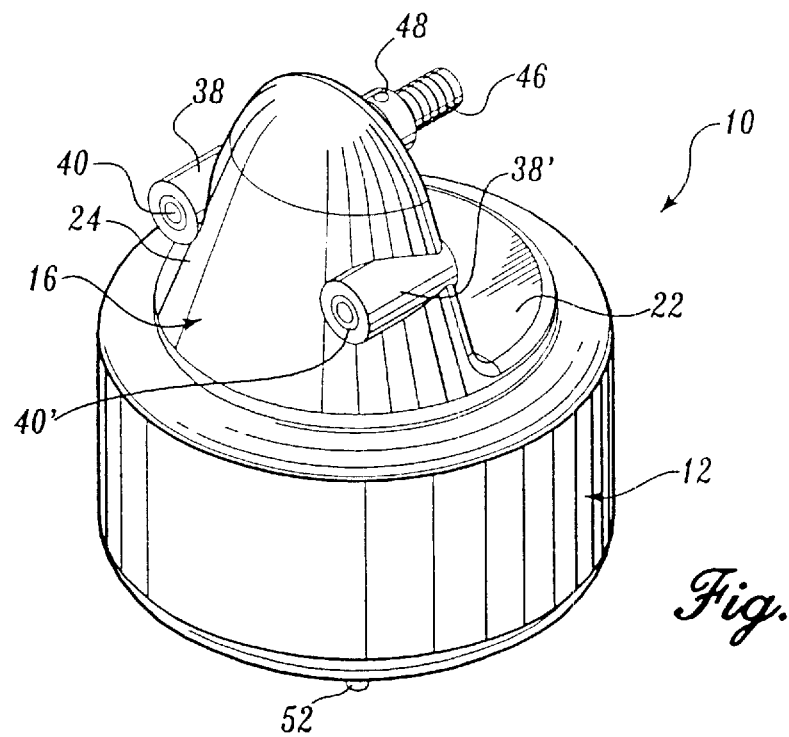
FIG. 1 is a perspective view of one embodiment of an integrated air spring formed in accordance with the present invention.
Figure 2:
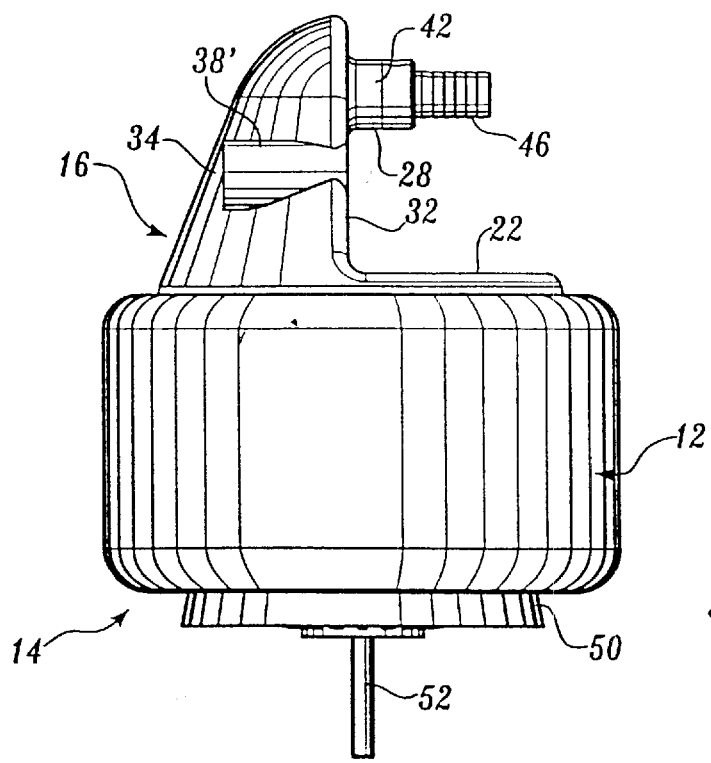
FIG. 2 is a side view of the air spring of FIG. 1.
Figure 5:
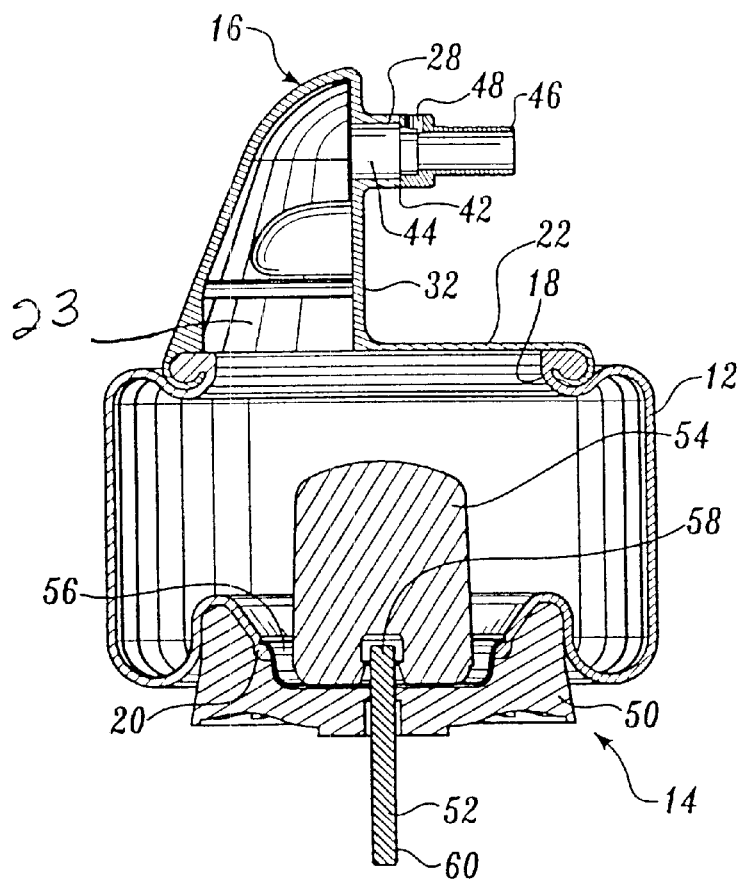
FIG. 5 is a cross-sectional side view taken along line 5—5 in FIG. 4.

Referring to FIGS. 1 and 5, the air spring 10 includes a flexible bladder 12, a support unit 14, and an integrated top assembly 16. The flexible bladder 12 is conventionally formed, with a generally cylindrical shape. The bladder includes a circular upper opening 18 and may include a circular lower opening 20, such as the one shown. The top assembly is connected to the upper opening of the bladder in an air-tight manner, such as by bead clamping as shown in FIG. 5, or other conventional means. The bladder is formed of known bladder materials, e.g., rubber, reinforced rubber, rubber compounds, etc.

Figure 4:
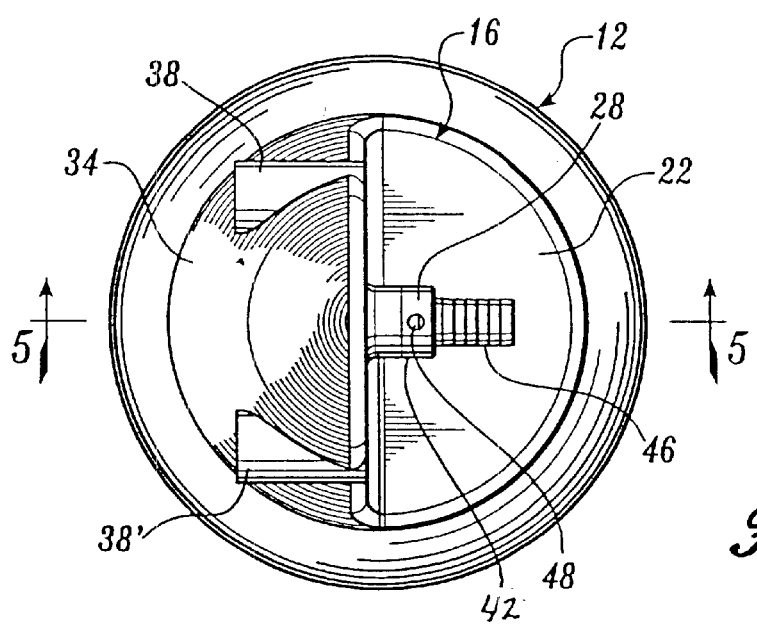
FIG. 4 is a top down view of the air spring of FIG. 1.

Referring to FIG. 1, the top assembly 16 is preferably a unitary component formed from injection molded plastic or from a thin wall casting (e.g., using ferrous materials, aluminum, magnesium, etc.) The top assembly 16 includes a lateral lower shelf 22, a body 24, attachment components, and a pneumatic connection port 28. In the embodiment of FIG. 1, the body is shaped similar to a half cone, where the cone has been divided vertically and so includes an upright surface 32 and a curved surface 34. The smaller end of the half cone is located above the larger, lower end of the half cone. Referring to FIG. 4, the lateral shelf 22 extends from the lower end of the cone to form a half circle having a radius similar to the radius of the half cone lower end.

Figure 6:
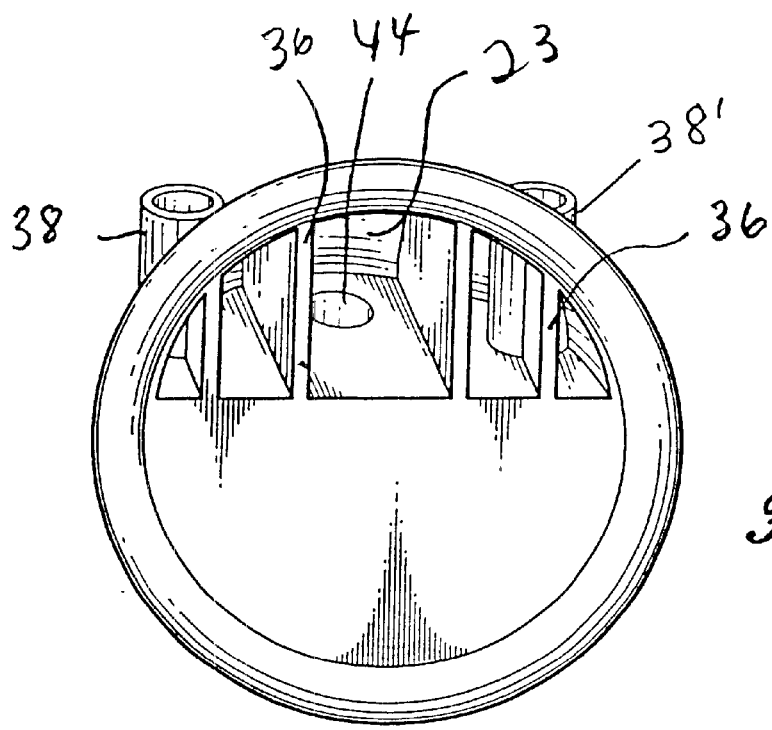
FIG. 6 is a bottom up perspective view of another embodiment of an integrated air spring in which internal ribs are provided in the top assembly.

Referring to FIGS. 5 and 6, the lateral shelf 22 does not extend completely across the body. Instead, the body includes an open interior volume 23 that is in pneumatic communication with the interior of the flexible bladder. The interior of the body optionally includes a number of support ribs 36. If ribs are included, as shown in FIG. 6, they may be molded in with the top assembly, spaced equally between sides, and/or oriented generally front to back. The ribs provide internal support for the top assembly during use. Alternatively, the ribs may emanate from a central location in the upright surface and fan out to connect to the interior of the conical body walls. As a further alternative, the ribs may be formed in a grid pattern. Ribs are optional and do not have to span the interior volume. The use of support ribs should be considered if the top assembly is to be made from plastic or composite materials.

The top assembly may be made in other shapes. The precise shape should allow for an internal volume and for any structural interior support, if needed. The final shape will also be affected by manufacturing considerations as well as installation considerations on the chassis. Depending on the space available for installation, the rib shape, location and pattern may need to be minimized to ensure a maximum internal volume, minimize affect on external aesthetics, and minimize secondary operations.

The top assembly interior volume acts to reduce the spring rate and natural frequency of the air spring. Spring rate is inversely proportionate to the internal volume and natural frequency varies with the square of the spring stiffness. Thus, the top assembly improves the overall performance of the air spring, which in turn, improves ride characteristics of the vehicle. Under-damped conditions should be considered during design and tuning of a particular air spring for a specific application.

The attachment components shown in the embodiment of FIGS. 1 and 4 are a pair of side moldings 38, 38' formed in the top assembly body. The side moldings appear as a pair of lateral arms positioned on the curved surface 34 at a midelevation. Each side molding includes a longitudinal hole 40, 40' to receive a mounting bolt or screw. The lateral arms and holes are used to connect the air springs to the vehicle's main frame longitudinal members 70 as described below. The holes may be threaded or bare, and as known to those with skill in the art may require the use of a sleeve to ensure proper installation. The holes 40, 40' are not pneumatically connected to the interior of the body in order to preserve the sealed, pressurized, nature of the volume 23. As will be appreciated, other attachment and fastening arrangements may be used, depending on the space, size, and loading requirements of a particular application. If a plastic is used to form the top assembly, a metal sleeve should be used within the holes.

The connection port 28 is pneumatically connected with other air springs of the motor vehicle suspension system and is available to shuffle air between the air springs. This improves the load distribution between springs during vehicle use. This interconnection is provided by various air-hoses (not shown) connected between air springs. As best shown in FIG. 5, the connection port 28 is formed as a rigid cylindrical mounting base 42 having an internal passage 44. The base 42 is integrally formed with the body 16 and extends outward from the body upright surface 32 near the body upper end. A variety of connections, such as a formed nipple 46, are available to interface with the various air hose parts. The base 42 may also include a fill port 48 connectable to a vehicle pressurized air supply source (such as compressor system) via leveling components. The internal passage 44 and fill port 48 are shown with a large diameter for clarity. In practice, the internal passage diameter is sized to optimize communication between air springs during operation.

The fill port is used to inflate and deflate the air spring as well as regulate the air pressure in the air spring thereby maintaining vehicle ride height. The fill port function is optional and not required for service, the exchange of air to and from the upper body being dependent on the design requirements of the particular application. A conventional height control valve (not shown) allows air to enter into or out of the bladder. Ride height control systems are known in the art and generally activate in relation to applied loads.

Figure 3:
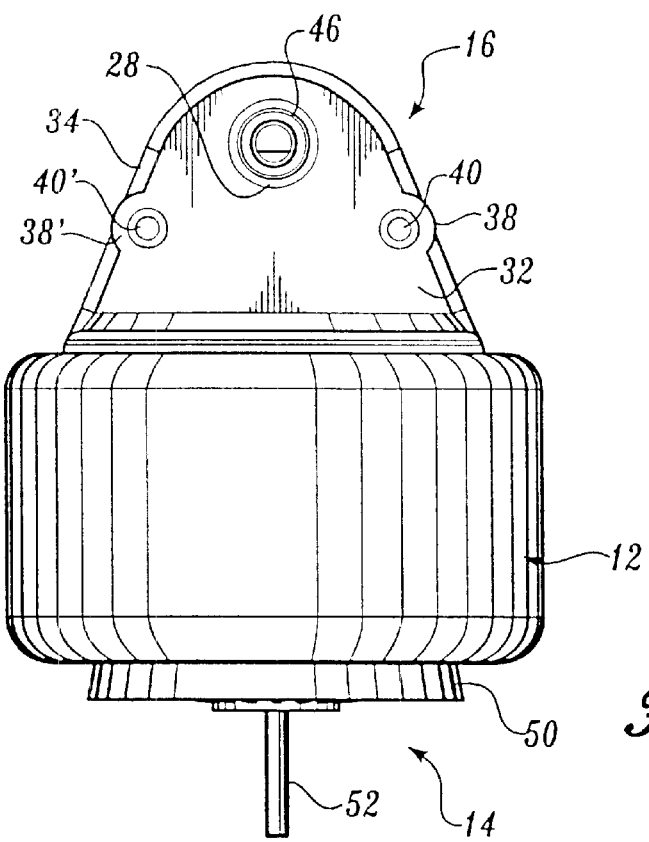
FIG. 3 is front view of the air spring of FIG. 1.

Referring to FIGS. 3 and 5, the support unit 14 includes a piston 50, an installation fastener 52, and an optional bumper 54. The piston 50 is conventionally formed and connected to the bladder in an air-tight manner, e.g., by use of an attachment plate 56 at the lower opening 20 as shown in the embodiment of FIG. 5, where the bladder is attached to plate 56 which rests on the piston. The installation fastener 52 is rotatably connected through the piston 50 and the attachment plate 56 via small holes formed in each. The fastener 52 includes a proximal end 58 and a distal end 60. The fastener is positioned with the distal end 60 extending from the lower surface of the piston 50. The proximal end 58 is disposed within the interior of the bladder 12. The bumper 54 is positioned about the proximal end 58 and is preferably rotatably attached thereto. The bumper 54 is utilized and sized to contact the underside of the top assembly and enhance the air-spring performance during rough road conditions. The bumper 54 is formed of a conventional bumper material, such as, rubber, rubber compounds, plastic, etc.

Figure 7:
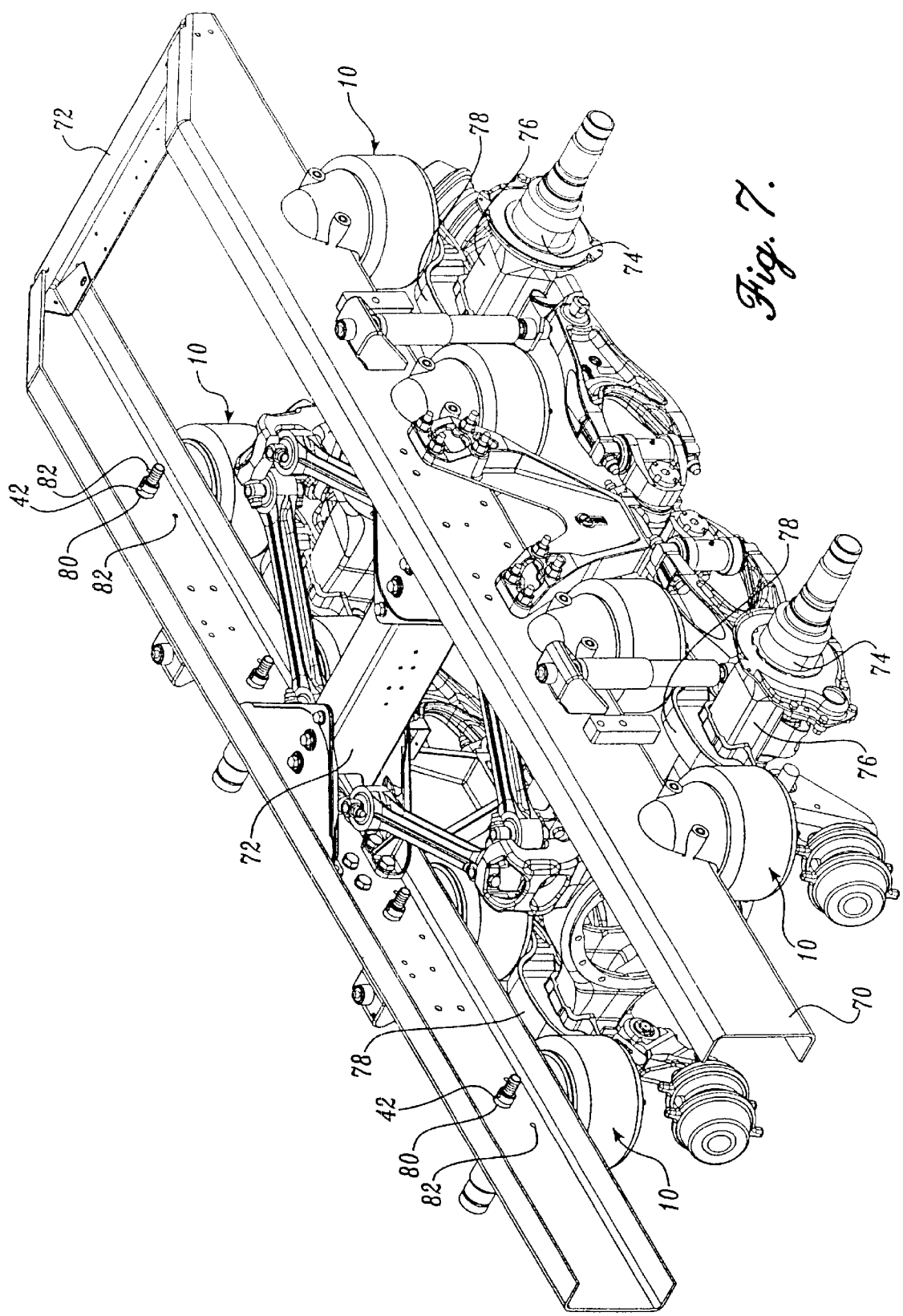
FIG. 7 is a perspective view of the air spring of FIG. 1 installed in a vehicle suspension system.

Referring to FIG. 7, and as is conventional in motor vehicles, the vehicle includes a main frame having parallel longitudinal members 70 interconnected by one or more cross members 72. Vehicle wheel axles 74 are generally connected to and/or located within transmission assembly 76. The vehicle wheels (not shown) are connected to the axle ends. A support bracket 78 is attached to the transmission assembly 76 near each wheel. The support brackets 78 are longitudinally and laterally oriented and include holes to movably connect with the air spring installation fasteners 52. The longitudinal members 70 are supported by the air springs 10. During use, the air springs 10 act to cushion the movement between the wheel axles 74 at the transmission assembly 76 and the main frame 70.

As installed, the installation fastener 52 of the present invention air spring inserts into the opening formed in a support bracket 78. The shelf 22 of the top assembly 16 is positioned below and adapted to support the vehicle main frames 70. As shown in FIG. 7, the top assembly body 16 is disposed along the frame outer side surfaces. Holes 80 in the main frames are available to receive the mounting base 42 of the pneumatic connection port 28 of the top assembly 16. Additional holes 82 are available to fasten the top assembly to the frame via the holes 40, 40' in the side moldings 38, 38'.

During use, the vertical motion of the wheels is transmitted to the support bracket 78 and in turn transmitted to the air spring piston 50. The piston 50 pushes into the bladder 12 causing energy to be absorbed by pressurization of air in the bladder. Air is replenished in the air spring 10 by a pressurized air supply source in the vehicle, via the air spring fill port 48. A typical air supply source is compressed air at 120 psi from a truck compressor system. Air distribution piping (not shown) is used to regulate air pressure between air springs by connecting between the ports 28. This advantageously equalizes pressure amongst air springs and improves their overall wear characteristics. In one embodiment, the air spring is formed to withstand operating air pressures in the range of about 15 psi to about 150 psi. Instances of 5 psi have also been found to work.

As will be appreciated from a reading of the above, the present invention air spring provides a number of benefits, including the ability to use a volume of air to lower the natural frequency of the suspension system and adjust the spring rate or stiffness to an acceptable design level. The present invention top assembly can be used to enhance the performance characteristics of other types of spring devices having a flexible wall as well.

Further, the present invention integrated air spring requires fewer parts to manufacture, resulting in easier manufacture and maintenance. In addition, by locating the attachment components in the top assembly and extending the base through the main frame, the distribution and air shuffling piping may be consolidated into fewer parts. The present invention integrates external piping and fittings, moves these connections to the vertical wall of the longitudinal frame members and improves air spring vertical load characteristics outboard of the frame.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. An air spring having a longitudinal axis, the air spring comprising:
   a support unit connectable to a vehicle suspension system;
   a top assembly including a base member and a body connected to said base member, wherein said body includes an uptight surface substantially parallel with the longitudinal axis of the air spring, said top assembly further including at least one attachment component positioned on said upright surface of said body and aligned substantially orthogonal to the longitudinal axis of the air spring, said top assembly being connectable to a main frame by said attachment component; and
   a flexible bladder disposed between said support unit and said top assembly, said flexible bladder having an upper opening and a lower opening, said upper opening sealingly connected to said top assembly and said lower opening sealingly connected to said support unit, defining a first fluid chamber within said flexible bladder;
   wherein said body includes an interior open volume forming a second fluid chamber disposed a spaced distance from said first fluid chamber, said second fluid chamber being in fluid communication with said first fluid chamber.

2. The air spring according to claims 1, wherein said body further includes a fluid connection fitting, said fluid connection fitting including a first port connectable in fluid communication with other air springs.

3. The air spring according to claim 2, wherein said body is generally formed in the shape of a half cone with a curved surface and an upright surface, said fluid connection fitting being formed as a rigid arm extending from said upright surface of said body.

4. The air spring according to claim 2, wherein said fluid connection fitting includes a fill port connectable in fluid communication with a ride height system.

5. The air spring according to claim 1, wherein said at least one attachment component is a pair of attachments components, said pair of attachment components being lateral arms extending from opposing sides of said upright surface of said body.

6. The air spring according to claim 5, wherein said lateral arms include threaded holes to engage threaded fasteners.

7. The air spring according to claim 5, wherein said lateral arms include through holes to engage fasteners.

8. The air spring according to claim 1, wherein said body includes a number of internal support ribs.

9. The air spring according to claim 8, wherein said internal support ribs are upright walls oriented front to back and in parallel relation to one another.

10. The air spring according to claim 1, wherein said top assembly is formed of a plastic or a composite material.

11. An air spring for use in a motor vehicle having a main frame, a suspension system, a pressurized air supply source, and a ride height system, said air spring further having a longitudinal axis, said air spring comprising:
   a support unit connectable to the vehicle suspension system;
   a top assembly including a base member having a top side and a bottom side and a body connected to and extending from said top side of said base member, said top assembly further including at least one attachment component positioned on said body and aligned substantially orthogonal to the longitudinal axis of the air spring, said top assembly being connectable to the vehicle main frame by said attachment component; and
   a flexible bladder disposed between said support unit and said top assembly, said flexible bladder having an upper opening and a lower opening, said upper opening sealingly connected to said bottom side of said base member and said lower opening sealingly connected to said support unit, defining a first fluid chamber within said flexible bladder;
   wherein said body includes an upright surface to which said attachment component is affixed, said upright surface disposed orthogonal to said base member, said body further defining a second fluid chamber disposed externally from said first fluid chamber, said second fluid chamber being in fluid communication with said first fluid chamber.

12. The air spring according to claim 11, wherein said body includes a number of internal support ribs.

13. The air spring according to claim 11, wherein said top assembly further includes a fluid connection fitting defining a first port connectable in pneumatic intercommunication with other air springs to allow air shuttling to and from the other air springs during use; said fluid connection fitting further defining a fill port connectable to the vehicle ride height system.

14. The air spring according to claim 11, wherein said at least one attachment component is a pair of attachment components, said pair of attachment components being lateral arms that extends from said body.

15. An air spring for use in a motor vehicle having a main frame, a suspension system, a pressurized air supply source, and a ride height system, said air spring defining a longitudinal axis, said air spring comprising:
   a support unit connectable to the vehicle suspension system;
   a top assembly including a base member and a body connected to said base member, said top assembly further including attachment components positioned on said body and aligned substantially orthogonal to the longitudinal axis of the air spring, said top assembly connectable to the vehicle main frame by said attachment components; and a flexible bladder disposed between said support unit and said top assembly, said flexible bladder having an upper opening and a lower opening, said upper opening sealingly connected to said top assembly and said lower opening sealingly connected to said support unit, defining a first fluid chamber within said flexible bladder;

wherein said body includes an upright surface to which said attachment components are affixed, said upright surface of said body being disposed orthogonal to said base member, said body forming a second fluid chamber disposed externally from said first fluid chamber, said second fluid chamber being in fluid communication with said first fluid chamber;

and wherein said top assembly further includes a fluid connection fitting connected to said upright surface of said body and being in fluid communication with said second chamber, said fluid connection fitting including a first port connectable in fluid intercommunication with other air springs to allow air shuttling to and from the other air springs during use and a fill port connectable to the vehicle ride height system to allow air shuttling to and from the other air springs during use.

* * * * *

UNITED STATES PATENT AND TRADEMARK OFFICE
CERTIFICATE OF CORRECTION

PATENT NO. : 6,679,485 B2
DATED : January 20, 2004
INVENTOR(S) : S.W. DeLizo et al.

It is certified that error appears in the above-identified patent and that said Letters Patent is hereby corrected as shown below:

Column 5,
Line 41, "uptight" should read -- upright --
Line 59, "claims 1," should read -- claim 1, --

Column 6,
Line 5, "pair of attachments" should read -- pair of attachment --
Line 59, "that extends" should read -- that extend --

Signed and Sealed this

Twenty-second Day of March, 2005

JON W. DUDAS
*Director of the United States Patent and Trademark Office*